United States Patent [19]

Sasaki et al.

[11] Patent Number: 4,954,575
[45] Date of Patent: Sep. 4, 1990

[54] METHACRYLIMIDE CONTAINING POLYMER

[75] Inventors: Isao Sasaki, Otake; Kozi Nishida, Toyama; Hisao Anzai, Otake, all of Japan

[73] Assignee: Mitsubishi Rayon Company, Limited, Tokyo, Japan

[21] Appl. No.: 458,396

[22] Filed: Dec. 28, 1989

[30] Foreign Application Priority Data

Dec. 29, 1988 [JP] Japan .................. 63-334722

[51] Int. Cl.$^5$ .............................. C08F 8/32
[52] U.S. Cl. ........................ 525/330.5; 525/324.9; 525/378; 525/379
[58] Field of Search ..................... 525/330.5, 329.9

[56] References Cited

U.S. PATENT DOCUMENTS 2,146,209  2/1939  De Witt Graves .
3,284,425  11/1966 Schroder et al. .
4,246,374  1/1981  Kopchik .
4,727,117  2/1988  Hallden-Abberton et al. .
4,745,159  5/1988  Anzai et al. .

Primary Examiner—Bernard Lipman
Attorney, Agent, or Firm—Oblon, Spivak, McClelland, Maier & Neustadt

[57] ABSTRACT

A methacrylimide containing polymer, which is a thermoplastic polymer comprising from 2 to 100% by weight of a structural unit represented by the general formula (I):

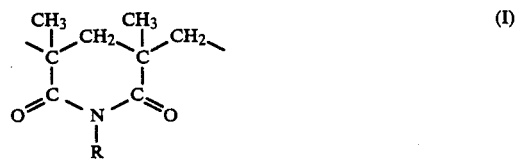

where R represents a hydrogen atom or an aliphatic group, aromatic group or cycloaliphatic hydrocarbon group with 1 to 20 carbon atoms, and from 0 to 98% by weight of a structural unit derived from an ethylenic monomer, in which a distribution range of an imidization radio of the polymer is less than 5%. The methacrylimide containing polymer has excellent transparency and heat resistance.

7 Claims, No Drawings

METHACRYLIMIDE CONTAINING POLYMER

BACKGROUND OF THE INVENTION

1. Field of the Invention

The present invention concerns a methacrylimide containing polymer of excellent transparency and heat resistance.

2. Description of the Prior Art

Methyl methacrylate polymers are excellent not only in transparency but also in mechanical property and weather proofness and, accordingly, they have been used as high performance optical plastic materials and decorative materials. In recent years, their uses have been developed in the field of short distance light communication or optical sensors.

However, since the heat distortion temperature of methyl methacrylate polymers is not sufficient being as low as about 100° C., their use is often restricted and thus, there is a strong demand in the market for improving the heat resistance.

As a method of improving the heat resistance of a methyl methacrylate polymer, there has been proposed, for example, (1) a method of reacting a polymer of acrylic acid, methacrylic acid or an ester thereof with a primary amine, ammonia or a compound of forming a primary amine or ammonia under the presence of a solvent (U.S. Pat. No. 2146209, German Pat. Nos. 1077872 and 1242369), (2) a method of reacting a methyl methacrylate polymer with a primary amine under the presence of water (U.S. Pat. No. 3284425) or (3) a method of reacting an acrylic polymer and ammonia or primary amine in an extruder (U.S. Pat. No. 4246374).

However, in the method (1) described above, since the boiling point of the solvent used is high, it is difficult to completely separate the solvent from the resultant imidized polymer in a commercial scale and, as a result, the imidized polymer obtained is colored to reduce its transparency. In the method (2) described above, since reaction is conducted under the presence of water, methyl methacrylate segments suffer from hydrolysis in the case of intending to obtain a partially imidized polymer, making it difficult to obtain an imidized polymer having a desired heat resistance, as well as it is also difficult to perform uniform imidization reaction. Further, in the method (3) described above, since the imidization reaction is conducted between a polymer of high viscosity and a gaseous imidizing material, it is difficult to conduct a homogenous imidization reaction making it difficult to obtain a homogenously and partially imidized polymer.

Accordingly, although the heat resistance of the imidized polymers obtained by the methods described above is somewhat improved, since the transparency is poor, the molecular weight is substantially reduced or imidization of the polymer is conducted only not homogenously upon commercial production, these methods have not yet been put to practical use at present.

Laid-Open Japanese patent applications Sho 60-210606 and Sho 62-187705 disclose polymethacrylimides with the total light transmission of 93 -94%, but it is difficult to control the imidization ratio with these methods. Although a polymethacrylimide of narrow distribution of imidization ratio can be obtained in a sampling within a short period of time, imidization ratio fractuates during continuous operation over several hours or several tens of hours.

An object of the present invention is to improve the foregoing drawbacks in the prior art and provide a methacylimide containing polymer possessing properties such as excellent optical property, mechanical property, weather proofness and fabricability inherent in methacrylate polymers and excellent in transparency and heat resistance, more in particular, excellent in transparency.

SUMMARY OF THE INVENTION

The foregoing object of the present invention is achieved by a methacrylimide containing polymer comprising from 2 to 100% by weight of a structural unit represented by the general formula (I):

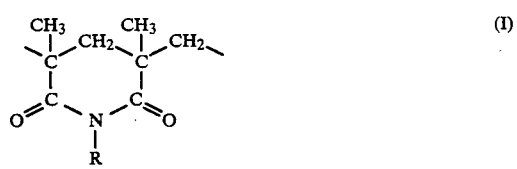

where R represents a hydrogen atom or an aliphatic group, aromatic group or cycloaliphatic hydrocarbon group with 1 to 20 carbon atoms, and from 0 to 98% by weight of a structural unit derived from an ethylenic monomer, wherein a distribution range of imidization ration in the polymer is less than 5%.

DETAILED DESCRIPTION OF THE PREFERRED EMBODIMENTS

The methacrylimide containing polymer with the distribution range of imidization ratio of less than 5% according to the present invention can be prepared by mixing a methacrylic acid ester polymer and one or more of compounds represented by the general formula (II):

where R represents a hydrogen atom or an aliphatic, aromatic or cycloaliphatic hydrocarbon group with 1 to 20 carbon atoms (hereinafter simply referred as "imidizing material") in a specific method substantially uniformly and then imidizing the methacrylic acid ester polymer under the presence of a specific solvent.

More preferably, the methacrylimide containing polymer according to the present invention can be produced continuously by the following method with a commercial advantage:

A solution comprising from 10 to 60% by weight of an inert solvent, from 90 to 40% by weight of methacrylic acid ester or a mixture of a methacrylic acid ester and an ethylenic monomer copolymerizable with the methacrylic acid ester, from 0.0001 to 0.5% by weight of a radical polymerization initiator and from 0 to 5% by weight of a polymer molecular weight regulator, is continuously introduced into the first reaction area in which reactants are mixed substantially uniformly and, after converting at least 80% by weight of the initial monomer into a polymer at a temperature from 80 to 170° C. in a second reaction area having a plug flow stream, resultant polymer solution and an imidizing material represented by the general formula (II) are subjected to an imidization reaction at a temperature from 50 to 190° C. for at least one minute in a third multi-stage reaction area having at least one upper region and at least one lower region under substantially uniformly mixed condition, and then, finally, the reaction solution heated to a temperature from 150 to 350° C. is introduced into an area at a sub-atmospheric pressure, in which volatile ingredients are continuously separated from the polymer by flashing. Then, the flashed polymer is received continuously by using a screw of an extruder and molded by the extruder.

The polymer according to the present invention and the production process therefor will be described in more detail.

The methacrylimide containing polymer in the present invention is an imidization product of a methacryl acid ester polymer. The methacrylic acid ester polymer to be imidized is a homopolymer of methacrylic acid ester or a copolymer of a methacrylic acid ester and an ethylenic monomer copolymerizable with methacrylic acid ester and has, preferably, from 0.01 to 3.0 of an intrinsic viscosity.

The methacrylic acid ester includes methyl methacrylate, ethyl methacrylate, propyl methacrylate, n-butyl methacrylate, isobutyl methacrylate, tert-butyl methacrylate, cyclohexyl methacrylate, norbonyl methacrylate, 2-ethylcyclohexyl methacrylate or benzyl methacrylate. As the copolymerizable ethylenic monomer, there can be mentioned methacrylic ester other than methyl methacrylate, acrylic acid ester such as methyl acrylate, ethyl acrylate, propyl acrylate, n-butyl acrylate, isobutyl acrylate, tert-butyl acrylate, cyclohexyl acrylate, norbonyl acrylate, 2-ethylhexyl acrylate and benzyl acrylate, acrylic acid, methacrylic acid, styrene and substituted styrene such as 2-methyl styrene. The above-mentioned monomer may be used alone or two or more of them may be used in combination.

Among the methacrylic acid ester polymers described above, a homopolymer of methyl methacrylate or a copolymer comprising more than 25% by weight of methyl methacrylate and less than 75% by weight of a copolymerizable ethylenic monomer is preferred. Among all, a homopolymer of methyl methacrylate is most preferred in view of its high transparency.

The polymerization reaction and the imidization reaction are carried out under the presence of a solvent. It is necessary that the inert solvent used herein does not hinder the progress of the polymerization reaction or the imidization reaction and does not substantially react with the reaction mixture. Further, in the case of partial imidization reaction, it is necessary that the solvent does not give any change on methyl methacrylate or other methaclylic arid ester segment. Further, the solvent should be easily separated from the resultant imidized polymer.

As a preferred example of the solvent, a solvent mixture comprising a poor solvent capable of hardly dissolving a methacrylic resin at an ambient temperature and having a boiling point under a normal pressure of 50 to 150° C. and a good solvent capable of easily dissolving the methyl methacrylate polymer is used. Preferably, poor solvents having solubility parameter $\delta$ within a range from 14.0 to 19.5 $(cal/cm^3)^{\frac{1}{2}}$ and good solvents having solubility parameter $\delta$ within a range from 8.0 to 13.9 $(cal/cm^3)^{\frac{1}{2}}$ are used in combination. An example of the poor solvent is methanol. Examples of good solvents can include alcohols such as pentanol, hexanol, 2-methylpentanol, 4-methyl-2-pentanol, 2-ethyl-1-butanol, 1-pentanol and octanol; aromatic hydrocarbon compounds such as benzene, toluene, xylene, ethylbenzene, cumene, mesitylene, naphthalene, tetralin, butyl benzene, diethyl benzene, pentyl benzene and biphenyl; ketones or ether compounds such as phorone, isophorone, cyclohexanone, acetophenone, dibutyl ether, dihexyl ether, anisole, phenetole, butyl phenyl ether, diphenyl ether, diglyme and diethylene glycol diethyl ether. Among good solvents, toluene, benzene, xylene and ethyl benzene are preferred.

The solubility parameter $\delta$ of the solvent used in the present invention means those values according to the standards as described in Polymer Handbook, Second Ed, J. Brandrup, E.H.Immergut, John, Wiley & Sons, New York (1975).

If the boiling point of the poor solvent and the good solvent exceeds 150° C. under a normal pressure, it is difficult to sufficiently remove volatile materials comprising the solvents as the main ingredient from the reaction products obtained by the imidization reaction. If it is lower than 50° C., since the temperature for the imidization reaction can not be increased due to the increase in the internal pressure of the reaction system, no sufficient imidization reaction can be conducted. In addition, since the volatile materials are evaporized suddenly upon separating from the reaction products, control in the devolatilizing operation becomes difficult. Further, if the solubility parameters of the poor solvent and the good solvent is out of the above-mentioned range, it is difficult to conduct uniform polymerization reaction and uniform imidization reaction, making it difficult to obtain a methacylimide containing polymer of excellent quality.

The amount of the solvent used is from 10 to 60 % by weight based on the total weight of the solvent and the monomer. If the amount of the solvent used is less than 10% by weight, the viscosity of the reaction system becomes too high, making it difficult to handle the reaction product. In addition, since the polymerization or imidization reaction proceeds not homogenously, the quality of the resultant polymer is deteriorated. If the amount of the solvent used exceeds 60% by weight, not only the separation of the solvent from the polymer becomes difficult but also productivity of the polymer is reduced. The amount of the solvent used is preferably from 20 to 50% by weight.

In the case of using the mixed solvent, the ratio of the poor solvent to the good solvent is from 99/1 to 1/99, preferably, from 90/10 to 10/90 (by weight ratio).

Since the inert solvent used easily diffuses the imidizing material between the methacrylic polymer molecules in the imidization reaction, thereby enabling to uniformly and rapidly conduct the imidization reaction and enabling to effectively control the heat generation and heat removal in the reaction, it is possible to obtain a methacrylimide containing polymer of excellent transparency and heat resistance as a desired optical material.

The radical polymerization initiator includes those which actively decompose to form radicals at the reaction temperature and there can be mentioned, for example, organic peroxides such as di-tert-butyl peroxide, dicumyl peroxide, methyl ethyl ketone peroxide, di-tert-butyl perphthalate, di-tert-butyl perbenzoate, tert-butyl peracetate, 2,5-dimethyl-2,5-di(tert-butyl peroxy)hexane, di-tert-amyl peroxide, 2,5-dimethyl-2,5-di-(tert butylperoxy)hexane, benzoyl peroxide and lauryl peroxide, as well as azo compounds such as azobisisobutanol diacetate, 1,1-azobiscyclohexane carbonitrile, 2- phenylazo-2,4-dimethyl-4-methoxyvalero nitrile, 2-cyano-2-propylazo formamide and 2,2'-azobisisobutyronitrile. These radical polymerization initiators may be used along or as a mixture of two or more of them. The amount of the radical polymerization initiator used is selected within a range from 0.0001 to 0.5% by weight based on the solution containing the monomer.

As the polymer molecular weight regulator, conventional regulators such as mercaptans can be mentioned. As specific examples of mercaptans used, there can be mentioned, for example, primary, secondary and tertiary mercaptans having alkyl group or substituted alkyl group, for example, n-butyl, isobutyl, n-octyl, n-dodecyl, sec-butyl, sec-dodecyl, tert-butyl mercaptan; aromatic mercaptans for example, phenyl mercaptan, thiocresol, 4-tert-butyl-o-thiocresol; thioglycolic acid and ester thereof; and mercaptans such as ethylene thioglycol having 3 to 18 carbon atoms. Further, as the non-mercaptan type molecular weight regulator, there can be used at least one of $\beta$- terpinolene, terpinol and alkyl-substituted-1,4-cyclohexadiene. As alkylsubstituted 1,4-cyclohexadiene, there can be mentioned, for example, $\gamma$-terpinene, 2-methyl-1,4-cyclohexadiene, 2,6-dimethylcyclohexadiene, 2,5-dimethylcyclohexadiene, 2-isopropyl-1,4-cyclohexadiene and 2-ethyl-1,4-cyclohexadiene. The substantial amount of the molecular weight regulator to be used is less than 5% by weight.

In a preferred process for continuously producing the methacrylic acid ester polymer, the monomer solution is introduced into the first reaction area in which reactans are mixed substantially uniformly and at least 40% by weight of the monomer is converted into a polymer at a temperature from 60 to 190° C. If the polymerization temperature in the first reaction area is lower than 60° C., the viscosity of polymer becomes too high, making it difficult to mix the polymer solution uniformly. If the polymerization temperature exceeds 190° C., formation of the side-reaction products is increased. Accordingly, the polymerization temperature in the first reaction area is from 60 to 190° C., preferably, from 70 to 180° C.

It has been found that if the conversion ratio of the monomer into the polymer in the first reaction area is less than 40% by weight, the heat decomposition resistance of the methacrylimide containing polymer finally obtained is deteriorated. Although the reason is not apparent, it is assumed to be attributable to the change of the terminal structure of polymer molecules relevant to the terminating reaction mechanism for the polymerization. If the heat decomposition resistance of the polymer is reduced, defects referred to as a silver streak are formed due to decomposed products during molding fabrication of the polymer to impair the appearance of the mold and deteriorate the physical property of the molded product as well. Accordingly, the conversion of the monomer into polymer in the first reaction area is at least 40% by weight, and preferably, at least 60% by weight. If the inside of the first reaction area is not mixed substantially uniformly and thus polymers with the conversion of not greater than 40% by weight remains in the reaction system as a part of the product, polymers of poor heat decomposition resistance are formed partially, thus it is necessary for the inside of the first reaction area be mixed sufficiently and to maintain a substantially homogenous state. The reaction area mixed substantially uniformly can be attained usually by using a stirring-mixing vessel equipped with a stirrer or anchor, helical ribbon, screw or paddle type.

The polymer solution leaving the first reaction area is successively polymerized in the second reaction area having a plug flow stream at a temperature of 80° C. to 170° C. such that at least 80% by weight of the initial monomer is converted into a polymer.

The imidizing material represented by the foregoing formula (II) used in the third reaction area partially reacts with, if any, remaining monomer to form low molecular weight amide derivatives as a high boiling point by-product. If a large amount of unpolymerized monomer remains in the reactants at the second reaction area and enters as it is into the third reaction area, formation of the amide derivatives is increased, making it difficult to separate them from the polymer. If the amide derivative remains in the reaction product, it results in coloration of the polymer of deterioration of the quality of the polymer. Accordingly, in order to suppress the formation of the amide derivatives in the third reaction area, the conversion for the initial monomer into polymer in the second reaction area is at least 80% by weight, preferably, at least 90% by weight.

For attaining a high conversion in the second reaction area, it requires a reaction device having a plug flow stream, that is, a device designed so as to have a relatively long shape in which the material is supplied from one end and discharged from the other end and mixing of the material in the longitudinal direction of the reaction device is not substantially taken place. As the example, there can be mentioned a screw extruder type reaction device as described in U.S. Pat. No. 3234303, a column-like reaction device as described in U.S. Pat. No. 3252950 and a tubular reaction device incorporated with buffle plates or a hollow tubular reaction device as described in British Pat. No. 2101139, etc.

The polymerization temperature in the second reaction area is lower than 170° C. The conversion in the second reaction area is set at least 80% with the reason as described above, but the highest polymerization ratio attainable is controlled by equilibrium between the growing reaction and reverse growing reaction of an active polymer at a specific temperature to be adopted for the polymerization. If the polymerization temperature exceeds 170° C., it becomes difficult to attain the conversion of 80%. On the other hand, if the polymerization temperature is lower than 80° C., the polymerization speed is reduced to bring about an economical disadvantage and the transportation of the reaction solution becomes difficult due to increased viscosity. Accordingly, the reaction temperature in the second reaction zone is from 80 to 170° C. and, preferably, from 90 to 160° C.

The imidizing material represented by the foregoing general formula (II) is added to a polymer solution leaving the second reaction area which is then introduced to the third reaction area. The imidizing material may be used along or being dissolved in and diluted with the inert solvent as described above.

In the present invention, a methacrylic polymer as a starting material and the imidizing material represented by the general formula (II) have to be mixed substantially uniformly before the imidization reaction. If the imidization reaction proceeds in a state where the methacrylic polymer and the imidizing material are not mixed uniformly, a not homogenous methacrylimide containing polymer is formed, by which the distribution range of the imidization ratio of the polymer is increased substantially, the transparency of the molding product is reduced and the commercial value including the quality of the final product is reduced. As a result of the studies on such problems, it has been found that the imidization reaction does not proceed at certain conditions and the methacrylic polymer and imidizing material are uniformly dissolved under the presence of the solvent used for the imidization reaction at the mixing stage and that a homogenous methacrylimide containing polymer can be produced with a commercial advantage.

As a method of uniform dissolution of the methacrylic polymer and the imidizing material in the solvent, it is important to apply stirring at least for more than one min at a temperature of 50 to 190° C. At a temperature in excess of 190° C., imidization reaction proceeds during mixing to bring about a not-uniform imidization reaction and, as a result, this produces a methacrylimide polymer having a large distribution range of the imidization ratio. On the other hand, if the temperature is lower than 50° C., it takes much time for the mixing and dissolution of the resin, and the viscosity of the solution is increased to invite a disadvantage as a commercial process. The mixing and dissolution requires at least one minute. Mixing requires stirring and in a case of continuous production, it is necessary to mix them while passing through a line using an inline mixer or static mixer.

If mixing in this region is insufficient, distribution range for the imidization ratio of the resultant methacrylimide containing polymer becomes broader to eventually form a mixture of methacrylimide containing polymers of different imidization ratios and they become not transparent and remarkably deteriorate its commercial value. It is preferred that the distribution range of the imidization ratio for the polymer is less than 5%, more preferably, less than 2%. Further, in the mixed solvent used in the production process, if δ values for the solubility parameter of the poor solvent and the good solvent is out of the abovementioned range, uniform dissolution becomes difficult and, as a result, uniform imidization reaction is difficult and the methacrylic imide containing polymer of excellent quality can not be obtained easily.

The third reaction area preferably comprises at least two reaction regions. One of the regions is a reaction region in which methacrylic polymer and imidizing material are reacted to cause condensation between side chains of the methacrylic polymer and the other region is an aging reaction region in which a reaction product containing the imidized polymer is further heated to promote the imidization reaction. Imidization for the methacrylic polymer is proceeded at least in two steps of the reaction area and the aging reaction area described above. Further, it is possible, if required, to combine a plurality of reaction regions or a plurality of aging regions. Reaction between the methacrylic polymer and the imidizing material in the reaction zone is carried out at a temperature higher than 150° C. and lower than 350° C. If the reaction is slow, whereas if it exceeds 350° C., decomposition reaction of the methacrylic polymer occurs simultaneously. There is no particular restriction for the reaction time in the reaction area but shorter period is preferred in view of the production efficiency and it is within a range from 20 min to 5 hours. In the case of continuous reaction, the average staying time is, likewise, within a range from about 20 min to about 5 hours.

In the imidization reaction, if water is present in the reaction system, hydrolysis of ester part of the methacrylic polymer with the water occurs as side reaction in the courses of the imidization reaction. As a result, methacrylic acid groups are formed in the resultant methacrylimide containing polymer, making it difficult to obtain a methacrylimide containing polymer having a high imidization ratio. Accordingly, the reaction is conducted under the conditions containing no substantial water in the reaction system, that is, with the water content of less than 1% by weight, preferably, under anhydrous condition.

Further, as the atmosphere for the reaction system, it is preferred to conduct reaction under an inert gas atmosphere in which nitrogen, helium or argon gas is present in view of low coloration of the resultant imidized polymer.

As specific examples of the imidizing material represented by the formula (II), there can be mentioned, for example, aliphatic primary amines such as methylamine, ethylamine and propylamine; compounds forming aliphatic primary amines under heating such as 1,3-dimethyl urea, 1,3-diethyl urea and 1,3-dipropyl urea; ammonia and urea. Further, there can be mentioned aromatic amines such as aniline, toluidine or trichloroaniline, as well as cycloaliphatic amines such as cyclohexylamine and bornyl amine.

Among the imidizing materials used, methylamine, ammonia and cyclohexylamine are preferred in view of high heat resistance and transparency of the imidized polymer.

Although the amount of imidizing material used depends on the imidization ratio to be attained and it can not be defined generally, it is from 1 to 250 parts by weight based on 100 parts by weight of the methacrylic acid ester polymer. If it is less than 1 part by weight, no distinct improvement for the heat resistance can be expected. On the other hand, if it exceed 250 parts by weight, it is not preferred from an economical point of view.

The imidization reaction product taken out from the reaction area is preferably supplied to the aging reaction area. The reaction in the aging reaction area is conducted like that the reaction in the preceding step at a temperature higher than 150° C. and lower than 350° C., preferably, higher than 170° C. and lower than 300° C. In the case of providing the agent reaction region, at least five min of aging time is required in the aging reaction region and, in a continuous reaction, more than 5 min of average staying time is also necessary. If the aging reaction is less than 5 min, no distinct aging effect can be expected. Although the reason for the effect that the aging reaction itself contributes to the product is not apparent, if the aging reaction is insufficient, unreacted amide segments remain in the imidized polymer products. Accordingly, properties of the polymer such as heat resistance, resistance to heat decomposition and the yellowness after the exposure to heat become undesirable. The amount of the non-volatile amide segment in the polymer is preferably less than 5% by weight.

The imidization ratio of the methacrylic resin is set to such a range that the structural unit represented by the general formula (I) is within a range from 2 to 100% by weight, preferably, 30 to 100% by weight and, more preferably, 50 to 100% by weight in view of high heat resistance of the polymer to be obtained.

The methacrylimide containing polymer obtained by imidization has an intrinsic viscosity from 0.02 to 4.5 (the measuring method is to be described later).

There is no particular restriction for the reaction apparatus used for practicing the present invention providing that they do not hinder the purpose of the present invention and there can be used, for example, a plug flow type reaction apparatus, screw extrusion type reaction apparatus, a column-like reaction apparatus, tubular reaction apparatus, a duct-like reaction apparatus and a vessel type reaction apparatus. For conducting the imidization uniformly and obtaining a homogenous methacrylimide containing polymer, it is preferred to use a vessel type reaction apparatus having a stirring device and equipped with a supplying port and a take-out port, in which a mixing function is provided to the entire inside of the reactor.

After the completion of the imidization reaction, volatile ingredients are separated from the imidized polymer. Volatile materials can effectively be separated by flashing while maintaining the reaction product containing a large amount of volatile materials in a stable fluidized state. That is, the reaction product is heated to a temperature of 180 to 300° C., preferably, 200 to 250° C. and then flashed through a narrow nozzle opening into a vessel controlled to a pressure less than the atmospheric pressure, preferably, a reduced pressure from 20 to 200 Torr. The flashed polymer is received by a screw of an extruder, passed through the extruder and then discharged as a strand from a dice of the extruder.

The residual volatile components in the reaction product can effectively be removed by the combined used of flashing under a reduced pressure and deaeration in an extruder. It is preferred to reduce the amount of low molecular weight amide derivatives as the volatile component in the polymer to less than 1000 ppm and the residual monomers to less than 500 ppm in order to prevent the yellowing of the molding products.

It is preferred that the monomer solution and the amine solution are passed through filters respectively to remove fine particles contained therein before supply to the reaction apparatus. A large amount of the fine particles will give undesired effect on the lightly transmission of the molding products, etc.

In the methacrylimide containing polymer according to the present invention, it is possible to add, as required, those additives such as antioxidant, plasticizer, lubricant, UV-absorbers, etc.

The methacrylimide containing polymer according to the present invention is excellent in the transparency and heat resistance, has an extremely narrow distribution range of the imidization ratio and an excellent quality.

Accordingly, it can be used to those application fields over a wide range, for example, as optical fibers, optical discs, CRT, filters, meters, displays for digital display boards, illumination and optical components, light covers of car head lamps, lenses, electric components, molding material for blending with other resins.

The present invention is to be described more in detail referring to examples but it should be noted that the invention is not restricted to the examples. In the examples, "parts" and "%" means, respectively, "parts by weight" and "% by weight" unless otherwise specified.

Measurement for the physical properties of the polymer in the following examples were carried out according to the methods described below.

(1) IR absorption spectra of the polymer were measured by using an IR spectrophotometer (Model 285, manufactured by Hitachi Ltd.) according to KBr disc (2) The intrinsic viscosity of the polymer was measured by determining the flowing time (ts) of a dimethylformamide solution at a concentration of the specimen polymer of 0.5% by weight and the flowing time (to) of dimethylformamide at a temperature of 25 ±0.1° C. by a Deereax-Bischoff viscometer, determining the relative viscosity $\eta rel$ of the polymer based on the value ts/to and then calculating by the following equation:

$$\text{Intrinsic viscosity} = \lim_{c \to 0} \ln(\eta rel)/c$$

where c represents the value for the grams of the polymer per 100 ml of solvent.

(3) Heat distortion temperature of the polymer was measured according to ASTM D-648

(4) The total light transmittance (%) of the molded product was measured according to ASTM D-1003.

An injection molded flat plate, sized 40×40×3 mm, was used as the specimen.

(5) Imidization ratio

The imidization ratio was calculated by determining the nitrogen content in the polymer based on elemental analysis (measuring device: CHN coder, MT-3, manufactured by Yanagimoto Seisakusho Co.) (Example) Imidization ratio X:

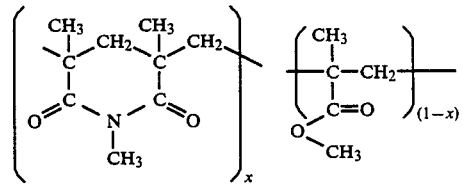

$$X (\%) = \frac{14x}{167x + (1-x)100} \times 100$$

(6) Distribution range of the imidization ratio

Pellets of methacrylimide containing polymer formed by the method (4) were used as a mother group, 20 specimens were optionally sampled therefrom and the imidization ratio was determined. The maximum value and the minimum value in the distribution were taken as the distribution range for the imidization ratio.

(7) Measurement for the light transmission (transmission loss)

The resultant pellet polymer was melt and formed into a strand of 1 mm diameter and applied with a coating of an outer layer of low refractive index to obtain an optical transmission material. The transmission loss of the optical transmission material was measured in accordance with the method as described in Laid-Open Japanese patent application Sho 62-187705.

(8) Recovery of pellet

All of the pellets obtained from 24 hour's continuous operation in examples and comparative examples were entirely mixed, unless otherwise specified, and served for analysis and evaluation of the performance.

(9) Content of fine particles

Five gram of the polymer was weighed and dissolved in 30 ml of dichloroethane and fine particles of 0.5 to 25

μm were measured by detecting the scattering of the laser beams with a counter previously calibrated.

(10) Yellowness index (YI value) of the molded product was measured by using a color difference meter, Color Analyzer (Model 307, manufactured by Hitachi Ltd.) according to the JIS K-7103.

An injection molded flat plate sized, 40×40×3 mm, was used as the specimen.

$$YI \text{ value} = \frac{100(1.28X - 1.06Z)}{Y}$$

X,Y and Z were calculated according to stimulation values.

EXAMPLE 1

A feed solution comprising 65 parts of methyl methacrylate, 30 parts of toluene, 5 parts of methanol, 0.08 parts of 1,1-azobiscyclohexane carbonitrile, 0.0325 parts of 2,2-azobisisobutyronitrile and 0.3 parts of n-octyl mercaptan was continuously supplied at a rate of 4 L/Hr into the first stirring vessel type reaction device of 20 liter inner volume. When the polymerization conversion just after leaving the reaction device was measured, it was 65%.

The polymer solution was introduced into a multitube type heat-exchanging second reactor (comprising 30 straight pipes each of 12.7 mm inner diameter and 1000 mm length) to proceed polymerization up to 95% conversion at a temperature of 140° C. Further, the polymer solution was mixed with the imidizing material described below and then supplied to the stirring vessel type reaction device as the third reaction area.

Separately, methylamine was added as an imidizing material to a mixed solvent (toluene:methanol = 1:1 weight ratio) and adjusted to prepare methyl amine solution of 40% by weight in the mixed solvent, mixed with the polymer solution described above and then supplied to the third reaction area as explained below. The solution of the imidizing material was supplied at a rate of 1.2 L/Hr. The imidizing material and the polymer solution were sufficiently mixed at 100° C. by using an inline mixer in a staying time of 5 min and then supplied to a stirring type reaction device (15 L inner volume, at a temperature of 230° C.) which is used as the imidization reaction region of the third reaction area. After imidization reaction, the reaction solution leaving the reaction region was supplied to a stirring vessel type reaction device (with an inner volume of 3 liter and at a temperature of 230° C.) which is used as the aging reaction region of the third reaction area. The reaction solution leaving the third reaction area was flashed into a vessel controlled to a reduced pressure of 100 Torr, the flashed polymer was supplied to a screw rendered corrosion resistant by chromium plating and then molded into a strand-like shape by a twine screw extruder with 30Φ double bent and finally pelletized. The twine screw extruder was set to a vacuum degree of 5 mmHg and a temperature of 260° C. in the bent portion, a temperature of 270° C. in the metering portion and a temperature of 255° C. in the dice portion.

When the IR spectra of the resultant pellet-polymer were measured, absroptions inherent in methacrylimide were observed at a number of waves of 1720 cm$^{-1}$, 1653 cm$^{-1}$ and 750 cm$^{-1}$, to confirm that it was methacrylimide containing polymer.

Physical properties of the resultant polymer are as shown below.

| | |
|---|---|
| Total light transmittance (%) | 93 |
| Heat distortion temperature (°C.) | 145 |
| Imidization ratio (%) | 80 |
| Distribution range for the imidization ratio (%) | 1.5 |

COMPARATIVE EXAMPLE 1

The same monomer composition, imidizing material, solvents and the same apparatus as those in Example 1 were used. However, the polymer solution leaving the second reactor and the imidizing material were mixed and imidized without using the inline mixer.

Physical properties of the resultant polymer are as shown below.

| | |
|---|---|
| Total light transmittance (%) | 86 |
| Heat distortion temperature (°C.) | 145 |
| Imidization ratio (%) | 80 |
| | (average) |
| Distribution range for the imidization ratio (%) | 7.5 |

When compared with Example 1, the methacrylimide containing polymer was poor in the transparency.

EXAMPLE 2

The procedures were quite the same as those in Example 1 except for using the reaction device saving the aging reaction area in Example 1 and the reaction solution leaving the reaction area was flashed under an atmospheric pressure.

EXAMPLE 3

The procedures were quite the same as those in Example 1 except for flashing the reaction solution leaving the reaction area under an atmospheric pressure in Example 1.

EXAMPLE 4

The procedures were quite the same as those in Example 1 except for using the reaction device saving the aging reaction area in Example 1.

EXAMPLE 5

The procedures were quite the same as those in Example 1 except for sampling each 0.5 k9 of the specimen for 20 times on every four hours among the polymer pellets produced continuously for 80 hours and mixing 10 kg of pellets in total for serving the evaluation in Example 1.

EXAMPLE 6

The procedures were quite the same as those in Example 2 except for filtering the starting material feed solution and the methylamine solution through 0.1 μm size Fluoropore in Example 2.

Results of analysis and the results of performance evaluation for the polymethacrylimide obtained in Examples 1-6 and Comparative Examples 1-3 are collectively shown in the table.

COMPARATIVE EXAMPLE 2

The procedures were quite the same as those in Example 4 except for mixing of the polymer solution and the imidizing material was carried out without using the inline mixer in Example 4.

COMPARATIVE EXAMPLE 3

A mixture comprising 100 parts of a methyl methacrylate, 0.1 part of 1,1'-azobiscyclohexane carbonitrile (polymerization initiator) and 0.5 parts of n-octyl mercaptan (polymerization modifier) was heated at 100° C. for 17 hours to obtain a methacrylic resin. The conversion of the methyl methacrylate to polymer was 99.9 % 100 parts of the methacryl resin and a mixture of 80 parts of toluene and 20 parts of methanol as a mixed solvent were charged into a 10 liter volume reactor equipped with a paddle spiral stirrer, a pressure gauge, a specimen injection vessel and a jacket heater. After sufficiently replacing air in the reactor with nitrogen, they were heated to temperature of 150° C. and stirred to dissolve the polymer. Then, 18.6 parts (0.6 molar ratio) of methylamine dissolved in methanol as a 50% solution was added at a temperature of 150° C. in the reactor and stirred at 150° C. for 30 min. Then, the temperature was elevated to 230° C. and they were reacted at an internal pressure of 60 kg/cm$^2$.G for 3.0 hours. After the reaction was over, a solution of N-methyl methacrylimide containing polymer was flashed from a nozzle opening into a vessel adjusted to a reduced pressure of 100 Torr, and the flashed polymer was supplied to a screw of L/D 20 20Φ bent type extruder and then molded in a strand by the extruder. When the IR absorption spectral of the resultant polymer were measured, absorption inherent in the methacrylimide containing polymer was observed at a number of waves: 1720 cm$^{-1}$, 1663 cm$^{-1}$, and 750 cm$^{-1}$. The conditions for the extruder were set to 5 mmHg of vacuum degree and 260° C. of temperature in the bed portion, 270° C. at metering portion, 255° C. of temperature in the dice portion.

The foregoing procedures were repeated five times and when imidization ratio was measured each by four points on every experiments, the distribution range of the imidization ratio for 20 measurement in total (of five times of experiments) was 6.5%. All of the resultant polymer was mixed, molded and evaluated. The results are shown in the table.

What is claimed is:

1. A methacrylimide containing polymer comprising from 2 to 100% by weight of a structural unit represented by the general formula (I):

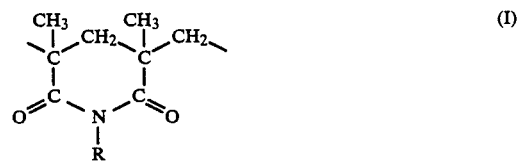

where R represents a hydrogen atom or an aliphatic group, aromatic group or cycloaliphatic hydrocarbon group with 1 to 20 carbon atoms, and from 0 to 98% by weight of a structural unit derived from an ethylenic monomer, the polymer having a distribution range of an imidization ratio of less than 5%.

2. The methacrylimide containing polymer as defined in claim 1, wherein the polymer is obtained by a continuous imidizing device capable of obtaining products of substantially identical imidization ratio stably even during continuous operation for a long period of time.

3. The methacrylimide containing polymer as defined in claim 1, wherein a number of fine particles sized from 0.5 μm to 25 μm in the polymer as measured by a fine particle counter is less than 50,000/g of the polymer.

4. The methacrylimide containing polymer as defined in claim 2, wherein a molecular weight (Mw) as measured by GPC is from 50,000 to 200,000.

5. The methacrylimide containing polymer as defined in claim 1, wherein a content of amide segments in the polymer is less than 5% by weight.

6. The methacrylimide containing polymer as defined in claim 1, wherein an amount of low molecular weight amide derivatives as a volatile ingredient in the polymer is less than 1000 ppm and an amount of the residual monomers as the volatile ingredient in the polymer is less than 500 ppm.

7. The methacrylimide containing polymer as defined in claim 1, wherein a YI (yellow index) value as measured by a color difference meter is 3 or below.

TABLE

| No. | Light transmittance (%) | HDT (°C.) | Imidization ratio (mol %) | Distribution of imidization ratio (%) | YI | Polymer amide (%) | Monomer amide (PPM) | Residual monomer (PPM) | Fine particles (particle/g) | Molecular weight (Mw) | OPF transmission (DB/KM) |
|---|---|---|---|---|---|---|---|---|---|---|---|
| Ex. 1 | 93 | 145 | 80 | 1.5 | — | — | — | — | — | — | — |
| Comp. 1 | 86 | 145 | 80 | 7.5 | — | — | — | — | — | — | — |
| Ex. 2 | 87 | 145 | 80 | 3 | 4.3 | 7 | 1600 | 700 | 100.000 | 85.000 | 5000 |
| Comp. 2 | 85 | 145 | 80 | 8 | 4.6 | 7 | 1700 | 700 | 100.000 | 85.000 | — |
| Ex. 3 | 89 | 145 | 80 | 3 | 2.6 | 1.2 | 1700 | 700 | 100.000 | 85.000 | — |
| Ex. 4 | 87 | 145 | 80 | 3 | 3.0 | 6 | 200 | 100 | 100.000 | 85.000 | — |
| Ex. 5 | 92 | 145 | 80 | 3.5 | 1.6 | 1.3 | 300 | 150 | 100.000 | 85.000 | — |
| Ex. 6 | 88 | 145 | 80 | 3 | 4.3 | 7 | 1700 | 700 | 14.000 | — | 4500 |
| Comp. 3 | 87 | 145 | 75 | 6.5 | — | — | — | — | — | — | — |